United States Patent Office 3,595,785
Patented July 27, 1971

3,595,785
METHOD AND COMPOSITIONS FOR REMOVING PHOSPHATES FROM WATER
Burnett D. Bruce, Wheaton, and Heinz Seiler, Cicero, Ill., assignors to Eagle-Picher Industries, Inc., Cincinnati, Ohio
No Drawing. Filed Feb. 5, 1970, Ser. No. 9,064
Int. Cl. C02b 1/18
U.S. Cl. 210—59                                   8 Claims

ABSTRACT OF THE DISCLOSURE

Method and compositions for inorganic phosphates from waste waters wherein the phosphate bearing water is contacted with a borosilicate glass composition containing from 5 to 25% by weight of one or more of the following oxides: calcium oxide, barium oxide and zinc oxide.

BACKGROUND OF THE INVENTION

Field of the invention

This invention is in the field of water purification wherein a waste water containing phosphate is treated with a particulate glass composition containing ions capable of precipitating the soluble phosphates and substantially reducing the content thereof in the water.

Description of the prior art

There has been a great deal of work done in recent years with regard to making "soft" detergent compositions, i.e., compositions in which the active surfactant is biologically degradable. While this is an important problem in pollution control, there is also the corollary problem of removing phosphates, since phosphates constitute the major portion of the typical package of household synthetic detergents. The presence of phosphates in water courses has been found to contribute substantially to the proliferation of algae growth, since one pound of phosphate will support the growth of thirty-nine pounds of algae.

There are a number of different types of phosphates which can be present in waste waters, and most of these come under the designation of condensed phoshpates. This term includes the pyrophosphates, the triphosphates and the glassy phosphates or metaphosphates. The condensed phosphates are made by the high temperature dehydration of orthophosphates, the ratio of sodium oxide to phosphorous pentoxide in the mixture determining to a large extent the composition of the final material. Each of these phosphates hydrolyzes in aqueous solution to eventually form the orthophosphate. An increase in temperature increases the rate of reversion of all three types of condensed phosphates. Similarly, reversion is slower in alkaline solutions than in acid solutions.

In addition to phosphate contamination from detergents, there is a significant amount of phosphate pollution caused by the discharge of cooling water from water cooler systems in industrial plants. Many such industrial plants employ phosphates as scale and corrosion inhibitors in cooling towers without providing any means for phosphate removal before the cooling water is discharged into the water course.

There have been some disclosures in patents relating to the problem of detergent and phosphate removal from waste water. For example, Dunning et al. in their U.S. Pat. No. 3,259,567 describe a process for the removal of phosphates and similar materials involving the use of oxides or hydroxides of calcium, barium, magnesium or strontium.

Jordan et al. in their U.S. Pat. No. 3,259,568 describe a process for the removal of phosphates from waters wherein the solution of phosphates is treated with a basic material such as the oxides, hydroxides or basic salts of the alkaline earth, alkali and/or rare earth metals to form a precipitate.

The Eck et al. Pat. No. 3,456,796 is specifically directed to the removal of dissolved phosphate ions from water and involves precipitating such phosphates by a combination of alum and a cationic or anionic wax dispersion, followed by separation of the substantially phosphate-free water from the phosphate containing precipitate.

SUMMARY OF THE INVENTION

The present invention provides a method and composition for substantially reducing the phosphate content of an aqueous solution which involves bringing the phosphate containing solution into contact with a borosilicate frit consisting of a partially soluble glass with the solute being rich in calcium, zinc or barium ions, or mixtures of these ions for reaction with the phosphates to produce the insoluble calcium, zinc or barium phosphates. The solubility of the frit should be such that the combined calcium, zinc and barium ions react to remove all of the contained phosphates. It is calculated that for one part of phosphate ion (calculated as $P_2O_5$) from 1 to 5 parts of calcium, zinc or barium ions are needed for complete precipitation of the soluble phosphate.

The borosilicates used for the purposes of the present invention contain from 5 to 25% by weight of one or more of the precipitating ions, calculated as their oxide, in the melted state, and preferably the frit contains all three with the content of each of the oxides in the melted frit being in the range from 5 to 25%, and the total amount of phosphate precipitating oxides is at least 20% by weight of the frit.

Other objects, features and advantages of the invention will be readily apparent from the following description of certain preferred embodiments thereof, although variations and modifications may be effected without departing from the spirit and scope of the novel concepts of the disclosure.

DESCRIPTION OF THE PREFERRED EMBODIMENTS

In the preferred embodiment of the present invention, a phosphate containing aqueous solution, typically a waste solution is passed through a fixed bed of the improved borosilicate frit of the present invention. Waste waters, of course, may contain various forms of phosphates and the following equations illustrate some of the chemical reactions which may go on to form the insoluble phosphate in the glass.

(1)          $HPO_4^{--} + Ca^{++} \rightarrow CaHPO_4$ (2)          $2PO_4^{---} + 3Ba^{++} \rightarrow Ba_3(PO_4)_2$ (3)          $P_2O_7^{----} + 2Zn^{++} \rightarrow Zn_2P_2O_7$ (4)          $2(P_3O_{10})^{-----} + 5Ca^{++} \rightarrow Ca_5(P_3O_{10})_2$ The borosilicate frit compositions which are particularly useful for the purposes of the present invention have analyses within the following ranges:

| | Percent by weight |
|---|---|
| $SiO_2$ | 10–40 |
| $Na_2O$ | 5–25 |
| $K_2O$ | 0–20 |
| $CaO$ | 5–25 |
| $BaO$ | 5–25 |
| $ZnO$ | 5–25 |
| $Al_2O_3$ | 0–10 |
| $B_2O_3$ | 5–50 |
| $F_2$ | 0–12 |

A particularly preferred composition for the purposes of the present invention is represented by the analysis given below:

| | Percent by weight |
|---|---|
| $SiO_2$ | 20–30 |
| $Na_2O$ | 10–20 |
| $K_2O$ | 1–5 |
| $CaO$ | 6–10 |
| $BaO$ | 6–10 |
| $ZnO$ | 6–10 |
| $Al_2O_3$ | 1–5 |
| $B_2O_3$ | 10–30 |
| $F_2$ | 1–5 |

The particle size of the frit particles in the filter bed is not critical. Generally, particles of less than 20 mesh and greater than 60 mesh can be suitably employed.

The following specific example illustrate an example of operation under the present invention although it will be recognized that wide variations in operating procedures and frit compositions are within the skill of the art.

EXAMPLE

A frit was made up having the following melted composition:

| | Percent of weight |
|---|---|
| $SiO_2$ | 23.2 |
| $Na_2O$ | 15.4 |
| $K_2O$ | 1.0 |
| $CaO$ | 10.1 |
| $BaO$ | 17.8 |
| $ZnO$ | 6.8 |
| $Al_2O_3$ | 1.6 |
| $B_2O_3$ | 22.7 |
| $F_2$ | 2.6 |
| | 101.2 |
| Less $O_2$ for $F_2$ | 1.2 |
| | 100.0 |

A filter column composed of the frit particles was made up from particles which had been sized through a 40 mesh U.S. Standard sieve and retained on the 50 mesh U.S. Standard sieve. A solution containing 0.1% phosphate ions was passed through the filter column and the effluent was then tested for phosphates. Such tests showed that all the phosphates had been removed.

The method and compositions of the present invention provide an economical and efficient means for removal of phosphates from aqueous solutions whereby the effluent can be passed directly into a water course without contributing to its pollution.

We claim as our invention:

1. The method of removing phosphate ions from an aqueous solution which comprises contacting said solution with particles of a borosilicate glass composition containing from 5 to 25% by weight of at least one oxide selected from the group consisting of calcium oxide, barium oxide and zinc oxide, said oxide being dissolved in the borosilicate glass matrix but being soluble in the aqueous solution so as to be reactable with said phosphate ions, and removing an aqueous solution having a reduced phosphate ion concentration.

2. The method of claim 1 in which said glass composition contains each of the three named oxides, each being present in the range from 5 to 25% by weight in the glass.

3. The method of claim 1 in which said glass composition is in the form of a fixed bed of frit particles and said solution is passed through said fixed bed.

4. The method of claim 1 in which said borosilicate glass composition has the following melted analysis:

| | Percent of weight |
|---|---|
| $SiO_2$ | 10–40 |
| $Na_2O$ | 5–25 |
| $K_2O$ | 0–20 |
| $CaO$ | 5–25 |
| $BaO$ | 5–25 |
| $ZnO$ | 5–25 |
| $Al_2O_3$ | 0–10 |
| $B_2O_3$ | 5–50 |
| $F_2$ | 0–12 |

5. The method of claim 1 in which said borosilicate glass composition has the following melted analysis:

| | Percent of weight |
|---|---|
| $SiO_2$ | 20–30 |
| $Na_2O$ | 10–20 |
| $K_2O$ | 1–5 |
| $CaO$ | 6–10 |
| $BaO$ | 6–10 |
| $ZnO$ | 6–10 |
| $Al_2O_3$ | 1–5 |
| $B_2O_3$ | 10–30 |
| $F_2$ | 1–5 |

6. A borosilicate frit composition adapted for removing phosphate ions from aqueous solution, said frit composition consisting essentially of the following ingredients:

| | Percent by weight |
|---|---|
| $SiO_2$ | 10–40 |
| $Na_2O$ | 5–25 |
| $K_2O$ | 0–20 |
| $CaO$ | 5–25 |
| $BaO$ | 5–25 |
| $ZnO$ | 5–25 |
| $Al_2O_3$ | 0–10 |
| $B_2O_3$ | 5–50 |
| $F_2$ | 0–12 | at least one of said calcium oxide, barium oxide and zinc oxide being dissolved in the borosilicate glass matrix but being soluble in the aqueous solution so as to be reactable with said phosphate ions.

7. A borosilicate frit composition adapted for removing phosphate ions from aqueous solution, said frit composition consisting essentially of the following ingredients:

| | Percent by weight |
|---|---|
| $SiO_2$ | 20–30 |
| $Na_2O$ | 10–20 |
| $K_2O$ | 1–5 |
| $CaO$ | 6–10 |
| $BaO$ | 6–10 |
| $ZnO$ | 6–10 |
| $Al_2O_3$ | 1–5 |
| $B_2O_3$ | 10–30 |
| $F_2$ | 1–5 | at least one of said calcium oxide, barium oxide and zinc oxide being dissolved in the borosilicate glass matrix but being soluble in the aqueous solution so as to be reactable with said phosphate ions.

8. The composition of claim 6 in which the total content of calcium oxide, barium oxide and zinc oxide constitutes at least 20% by weight of the frit.

References Cited

UNITED STATES PATENTS

| | | | |
|---|---|---|---|
| 3,095,311 | 6/1963 | Von Wranav et al. | 106—54X |
| 3,100,714 | 8/1963 | Bromer et al. | 106—54 |
| 3,259,567 | 7/1966 | Dunning et al. | 210—21 |
| 3,420,648 | 1/1969 | Andrews et al. | 106—54X |
| 3,446,637 | 5/1969 | Earl | 106—54X |
| 3,499,837 | 3/1970 | Jaunarajs | 210—59 |
| 3,526,322 | 9/1970 | Burroughs | 210—510X |

OTHER REFERENCES

Hensley, J. W.: Chem. Abstracts, vol. 45, 7320g–i (P.O.S.L.).

Baier, E., et al.: Chem. Abstracts, vol. 65, 3515e–g (P.O.S.L.).

MICHAEL ROGERS, Primary Examiner

U.S. Cl. X.R.

23—109; 106—54; 252—175